July 13, 1965     R. G. BURIG ET AL     3,195,043

HALL EFFECT PROXIMITY TRANSDUCER

Filed May 19, 1961

WITNESSES

INVENTORS
Robert G. Burig &
Edward A. Petrocelli.
BY
ATTORNEY

3,195,043
HALL EFFECT PROXIMITY TRANSDUCER
Robert G. Burig, McKeesport, and Edward A. Petrocelli, Murrysville, Pa., assignors to Westinghouse Electric Corporation, East Pittsburgh, Pa., a corporation of Pennsylvania
Filed May 19, 1961, Ser. No. 111,311
3 Claims. (Cl. 324—45)

The present invention relates to proximity transducers, and more particularly to proximity transducers using the Hall effect as a sensing device.

In order to detect the presence or absence of a magnetic object, it is necessary to change some characteristic of the detector apparatus. The variation of an electrical characteristic in response to the proximity of an object to be detected is desirable to be utilized because of the relative ease of detecting an electrical change once effected. However, the problems arise of providing a transducer sensitive enough to change its electrical characteristic sufficiently to be detected with changes in the proximity of a magnetic object, and also to provide the supplementary circuitry to utilize any change in electrical characteristics to supply a meaningful output for control purposes. In the past, various proximity detector transducers have been suggested operating on the principle of changing the inductance of the transducer pickup in response to the proximity of an object. The change in inductance is then used to vary the feedback characteristics of an oscillator circuit to either change the frequency of oscillation or to stop oscillations altogether. Because of the complexity of apparatus and circuitry required, slow response time in providing a control signal, and the necessarily large size of the transducer pickup to produce a detectable change in characteristics it is often prohibitive to use such a proximity transducer in many applications.

It is therefore an object of the present invention to provide a new and improved proximity transducer which utilizes the Hall effect.

It is a further object of the present invention to provide a proximity transducer to detect the presence of an object and provide a control signal by utilizing the Hall effect.

Briefly, the present invention provides a proximity transducer for detecting the presence of a magnetic object, wherein; the magnetic field across a Hall generator device, whose output is proportional to the product of the current and magnetic field applied thereto, is concentrated across the device due to the presence of an object desired to be detected, the increased output activates a sensing circuit to change operating states, thus being indicative of the presence of the object.

These and other objects will become more apparent when considered in view of the following specification and drawing, in which.

Figure 1A:
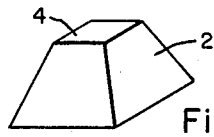
FIGURE 1a is a sketch of the pole piece as embodied in the transducer pickup of the present invention.
Figure 1B:
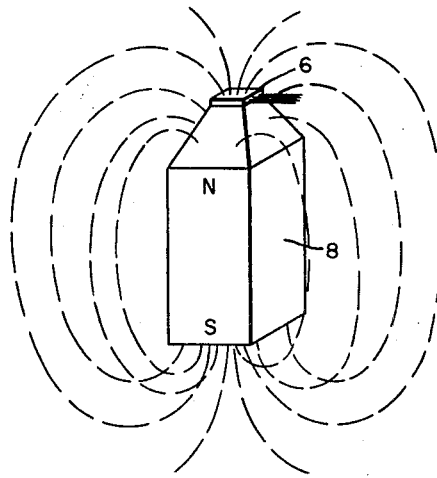
FIG. 1b is a sketch of the transducer pickup of the present invention.
Figure 1C:
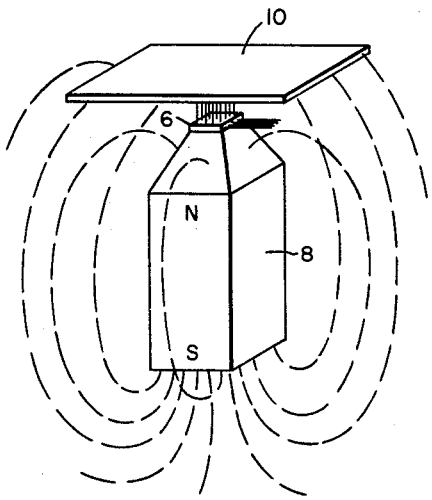
FIG. 1c is a sketch of the transducer pickup of the present invention in the presence of an object desired to be detected.

In a Hall generator, the traverse Hall output voltage is proportional to the longitudinal current and the perpendicular magnetic field applied thereto. If the current is maintained at a constant value the output of the Hall generator may be controlled by varying the magnetic field strength across the device. The sensitivity of the pickup of the Hall generator is dependent upon the manner in which the magnetic field is applied, so referring to FIG. 1a, a tapered pole piece of for example soft iron, which does not readily become a permanent magnet itself, is provided upon which a Hall generator is mounted on the smaller surface 4. FIG. 1b shows the Hall generator 6 mounted on the pole piece 2 which in turn is mounted on the permanent magnet 8, which for example may be of the ceramic type. As is shown in FIG. 1b, only a small part of the magnetic field of the permanent magnet 8 passes through the Hall generator 6, while a considerable percentage of the flux passes as stray flux through the pole piece 2 and then returns to the other pole of the magnet. In FIG. 1c, an object 10, which may be a metal sheet, is shown over the Hall generator 6. The presence of the object 10 causes the flux path of the permanent magnet 8 to be concentrated through the face of the pole piece and thus through the Hall generator 6, as the generator covers substantially the total surface of the face 4 of the pole piece 2. In the absence of the object 10 a smaller amount of peak flux passes through the Hall generator so its output is smaller; however, when the object 10 is present a better path for the flux is provided through the metallic object 10 and so there is less leakage flux and the flux is concentrated through the Hall generator device 6 and therefore increases its output voltage by a readily detectable amount.

Figure 2:
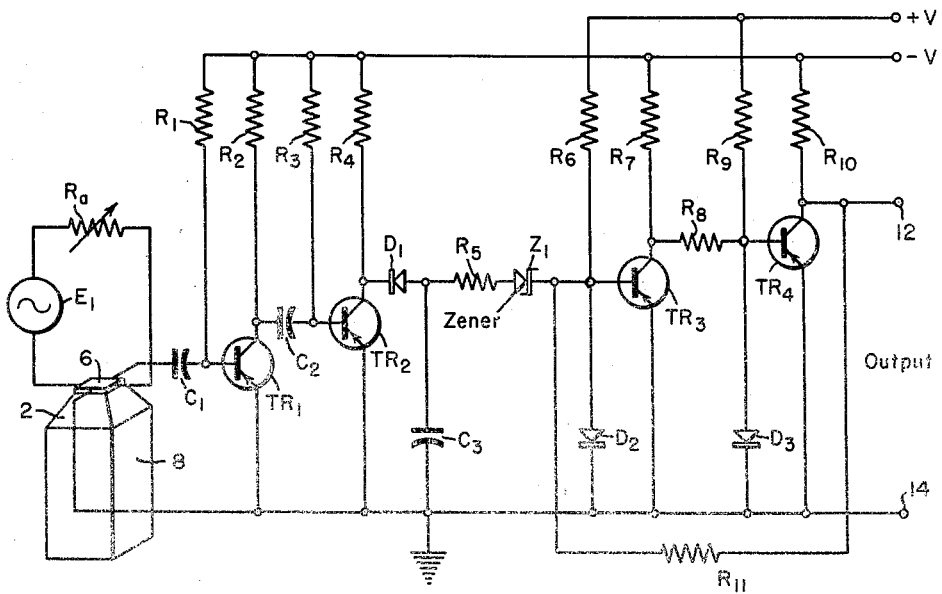
FIG. 2 is a schematic diagram embodying the features of the present invention.

Referring to FIG. 2, the Hall generator 6 is shown mounted on the pole piece 2 of the permanent magnet 8, and an alternating current source $E_1$ is applied through the current limiting and control resistor $R_a$, which is adjustable, to the Hall generator device 6. The output of the Hall generator device 6 is coupled to the transistor $TR_1$ by the capacitor $C_1$ which prevents the low impedance Hall generator 6 from shunting the base bias current from transistor $TR_1$. Base bias is supplied to the transistor $TR_1$ through the resistor $R_1$ from the bias source —V, not shown. The collector of the transistor $TR_1$ is connected through the resistor $R_2$ to —V. The output of the transistor $TR_1$ from its collector is coupled to the transistor $TR_2$ by the capacitor $C_2$, eliminating any amplification of leakage current and allowing the transistor $TR_2$ to be independently biased by the resistor $R_3$ which is connected to —V. The collector of the transistor $TR_2$ is connected through the resistor $R_4$ to —V. Because the transistor $TR_2$ is biased to a mid-point between cutoff and saturation, with no output from the Hall generator 6, a D.C. voltage appears at its collector. The voltage appearing at the collector of the transistor $TR_2$ charges the capacitor $C_3$ through the diode $D_1$ to the polarity as shown. The voltage across the capacitor $C_3$ also appears partially across the Zener diode $Z_1$. However, the D.C. operating voltage without any output from the Hall generator 6 is below the Zener diode $Z_1$ breakdown voltage.

In the state when there is no magnetic object in the proximity of the Hall generator 6, as shown in FIG. 1b, a small amount of flux passes through the Hall generator which causes it to have an output voltage. This alternating output voltage proportional to the product of the current supplied by the alternating current source $E_1$ and the magnetic field that appears across the Hall generator 6 is amplified in the transistors $TR_1$ and $TR_2$, and is converted to a D.C. voltage by the diode $D_1$, which further charges the capacitor $C_3$ to a higher voltage. Nevertheless, the voltage to which the capacitor $C_3$ is charged is controlled to be smaller than the necessary breakdown voltage across the Zener diode $Z_1$ by adjusting the control resistor $R_a$ to control the current supplied by the source $E_1$. When a magnetic object 10, as is shown in FIG. 1c, is brought into proximity of the Hall generator 6, the flux is concentrated through the Hall generator which increases its output enough to cause the capacitor $C_3$ to be charged to a great enough value to exceed the breakdown voltage of the Zener diode $Z_1$. When the Zener diode $Z_1$ conducts in its reverse direction, it supplies a path for base current for the transistor $TR_3$.

The combination of the transistor $TR_3$ and transistor $TR_4$ forms a monostable flip-flop output stage in which the transistor $TR_4$ is normally saturated, and so provides no output across the terminals 12 and 14. With the transistor $TR_4$ in saturation the transistor $TR_3$, before the Zener diode $Z_1$ breaks down, is cutoff, since base current for $TR_3$ is prevented from passing through the resistor $R_{11}$. Since the transistor $TR_3$ is cutoff, the resistor $R_8$, connected between the base of the transistor $TR_4$ and the collector of transistor $TR_3$ allows base current to flow in the transistor $TR_4$, with the resistor $R_7$ being connected from the collector of the transistor $TR_3$ to $-V$. At the time the Zener diode $Z_1$ breaks down, when the object 10 is over the Hall generator, a discharge path for the capacitor $C_3$ is provided to allow base current to flow through the transistor $TR_3$, the reverse direction of the Zener diode $Z_1$, the resistor $R_5$, diode $D_1$ and the resistor $R_4$ to $-V$. As the transistor $TR_3$ begins to conduct, the base current of the transistor $TR_4$ decreases and begins to drive it from saturation, which in turn furnishes even more base current to transistor $TR_3$. In order to quickly drive the transistor $TR_4$ out of saturation, a positive feedback path including the resistor $R_{11}$ is provided to allow base current from the transistor $TR_3$ to flow through the resistor $R_{11}$ to the collector of the transistor $TR_4$; thus providing a very rapid change of states from saturation to nonsaturation of the transistor $TR_4$. It should be noted that neither of the paths through the reverse direction of the Zener diode $Z$, or the feedback resistor $R_{11}$ is sufficient alone to change states of the monostable flip-flop. However, both paths acting together are sufficient to drive the transistor $TR_4$ out of saturation. The diodes $D_2$ and $D_3$ are used to clamp the bases of the transistors $TR_3$ and $TR_4$, respectively, at a small voltage to avoid excessive voltages across the base to collector junctions, while the resistors $R_6$ and $R_9$ connected with positive bias potential $+V$, not shown, are used for temperature stability for the flip-flop circuit being respectively connected to the bases of the transistors $TR_3$ and $TR_4$. Since the state of the monostable flip-flop is rapidly changed by driving the transistor $TR_4$ out of saturation and the transistor $TR_3$ into saturation by the presence of a magnetic object 10 being in the proximity of the Hall generator device 6, the output signal appearing across the terminals 12 and 14 may be used to activate control circuitry to indicate the presence of the object 10. As the response times of the semiconductor elements used are very rapid, virtually no delay will exist before the output signal across the terminals 12 and 14 can be utilized for control purposes.

Although the present invention has been described with a certain degree of particularity, it should be understood that the present disclosure has been made only by way of example and that numerous changes in the details of the circuitry and the combination of arrangement of elements may be resorted to without departing from the scope and spirit of the present invention.

We claim as our invention:

1. A proximity transducer including, a Hall generator device operative to provide an output signal proportional to the product of the current and magnetic field applied thereto, means for applying current to said device, magnetic means operative to provide a magnetic field across said device, said magnetic means including a permanent magnet and a tapered pole piece comprising a soft magnetic material having low residual magnetism, monostable switching means normally providing no output and being operative to change states when actuated to provide an output, and sensing means operative to activate said switching means to its output state when the magnetic field through said Hall generator device is concentrated above a predetermined magnetic field strength by the presence of an object desired to be detected, said sensing means including a Zener diode being operative to breakdown when the output signals of said Hall generator device exceed a predetermined value in response to an increase in magnetic field strength.

2. A proximity transducer including, a Hall generator device operative to provide an output signal proportional to the product of the current and magnetic field applied thereto, means for applying current to said device, magnetic means operative to provide a magnetic field across said device, said magnetic means including a permanent magnet and a tapered pole piece of soft magnetic material having low residual magnetism, said pole piece being adjacent said Hall generator device with said device covering a substantial portion of the tapered end of said pole piece, monostable switching means normally providing no output and being operative to change states when actuated to provide an output, and sensing means operative to activate said switching means to its output state when the magnetic field through said Hall generator device is concentrated above a predetermined magnetic field strength by the presence of an object desired to be detected, said sensing means including storage means which is charged to an energy level in response to the output signals of said device and a Zener diode operatively connected across said storage means and being operative to break down when the output signals of said device exceed a predetermined value in response to an increase in magnetic field strength.

3. A proximity transducer including, a Hall generator device operative to provide an output signal proportional to the product of the current and magnetic field applied thereto, an alternating current source operatively connected to said device to supply current to said device, magnetic means operative to provide a magnetic field traverse to said current across said device, said magnetic means including a permanent magnet and a pole piece of tapered cross section comprising a soft magnetic material having low residual magnetism, said pole piece being adjacent said Hall generator device with said device covering a substantial portion of the tapered end of said pole piece, monostable switching means normally providing no output and being operative to change states when actuated to provide an output, and sensing means operative to activate said switching means to its output state when the magnetic field through said Hall generator device is concentrated above a predetermined magnetic field strength by the presence of an object desired to be detected, said sensing means operatively connected to receive the output signals of said Hall generator device and including storage means which is charged to an energy level in response to said output signals of said device and a Zener diode operatively connected across said storage means and being operative to break down when the output signals of said device exceed a predetermined value in response to an increase in magnetic field strength.

References Cited by the Examiner

UNITED STATES PATENTS

| | | | |
|---|---|---|---|
| 2,957,109 | 10/60 | White et al. | 324—45 X |
| 2,991,414 | 7/61 | Tillman | 324—43 |
| 3,035,183 | 5/62 | Siebertz et al. | 307—88.5 |
| 3,060,370 | 10/62 | Varterasian. | |

WALTER L. CARLSON, *Primary Examiner.*

FREDERICK M. STRADER, *Examiner.*